United States Patent
Schlipf et al.

(10) Patent No.: US 9,422,050 B2
(45) Date of Patent: Aug. 23, 2016

(54) FORE FLAP DISPOSED ON THE WING OF AN AIRCRAFT

(75) Inventors: Bernhard Schlipf, Bremen (DE); Xavier Hue, Bremen (DE)

(73) Assignee: Airbus Operations GmbH, Hamburg (DE)

(*) Notice: Subject to any disclaimer, the term of this patent is extended or adjusted under 35 U.S.C. 154(b) by 717 days.

(21) Appl. No.: 13/122,733

(22) PCT Filed: Oct. 6, 2009

(86) PCT No.: PCT/EP2009/007167
§ 371 (c)(1),
(2), (4) Date: Jul. 2, 2011

(87) PCT Pub. No.: WO2010/040501
PCT Pub. Date: Apr. 15, 2010

(65) Prior Publication Data
US 2011/0248122 A1 Oct. 13, 2011

Related U.S. Application Data

(60) Provisional application No. 61/102,977, filed on Oct. 6, 2008.

(30) Foreign Application Priority Data

Oct. 6, 2008 (DE) .................. 10 2008 050 544

(51) Int. Cl.
*B64C 3/48* (2006.01)
*B64C 3/50* (2006.01)
(Continued)

(52) U.S. Cl.
CPC ............. *B64C 9/24* (2013.01); *B64C 2009/143* (2013.01)

(58) Field of Classification Search
CPC .............. B64C 9/24; B64C 9/16; B64C 9/22; B64C 3/50; B64C 9/18; B64C 9/02; B64C 3/48; B64C 2009/143; B64C 9/20

USPC ........................................ 244/201, 213–215
See application file for complete search history.

(56) References Cited

U.S. PATENT DOCUMENTS 4,040,579 A * 8/1977 McKinney .................... 244/214
4,120,470 A * 10/1978 Whitener ...................... 244/213
(Continued)

FOREIGN PATENT DOCUMENTS

CN 1243485 2/2002
CN 101115655 1/2008
(Continued)

OTHER PUBLICATIONS

PCT International Search Report, prepared by European Patent Office, Application No. PCT/EP2009/007167 (publication WO 2010/040501 A3), Mailed Jun. 7, 2010.
(Continued)

*Primary Examiner* — Marc Burgess
(74) *Attorney, Agent, or Firm* — Jenkins, Wilson, Taylor & Hunt, P.A.

(57) ABSTRACT

A leading edge slat arranged on the aerofoil of an aircraft. The leading edge slat is provided on the front of the main wing. The leading edge slat has a partially extended setting, with its trailing edge flat against the wing, and a further extended setting, with its trailing edge spaced apart from the nose of the wing to open a gap feeding high-energy air from the lower surface of the slat to the upper surface of the wing. The leading edge slat includes a body and a trailing edge facing the main wing, which can be bent around the spanwise direction of the slat relative to the body, and on which the trailing edge of the slat is provided, and which by means of a device generating a contact force is loaded for making contact between the trailing edge of the slat and the profile nose of the wing.

4 Claims, 3 Drawing Sheets

(51) Int. Cl.
 *B64C 9/24* (2006.01)
 *B64C 9/14* (2006.01)

(56) References Cited

U.S. PATENT DOCUMENTS

| | | | |
|---|---|---|---|
| 4,159,089 A * | 6/1979 | Cole | 244/214 |
| 4,399,970 A | 8/1983 | Evans | |
| 4,553,721 A | 11/1985 | Jorgensen | |
| 4,650,140 A * | 3/1987 | Cole | 244/214 |
| 4,753,402 A | 6/1988 | Cole | |
| 5,839,699 A | 11/1998 | Bliesner | |
| 6,419,187 B1 | 7/2002 | Buter et al. | |
| 6,682,023 B2 | 1/2004 | Broadbent | |
| 7,243,881 B2 * | 7/2007 | Sakurai et al. | 244/212 |
| 7,520,471 B2 * | 4/2009 | Reckzeh et al. | 244/215 |
| 8,382,044 B2 * | 2/2013 | Holzhausen | 244/213 |
| 8,596,586 B2 * | 12/2013 | Schroeder | 244/214 |
| 2002/0195527 A1 | 12/2002 | Broadbent | |
| 2005/0061922 A1 | 3/2005 | Milliere | |
| 2010/0219299 A1 | 9/2010 | Holzhausen | |
| 2012/0292454 A1 * | 11/2012 | Schroeder | B64C 9/24 244/214 |
| 2014/0048655 A1 * | 2/2014 | Hue | B64C 9/02 244/214 |

FOREIGN PATENT DOCUMENTS

| | | |
|---|---|---|
| CN | 101108520 | 6/2008 |
| DE | 198 04 308 C2 | 10/2003 |
| DE | 10 2006 053259 A1 | 5/2008 |
| DE | 100 54 643 B4 | 6/2008 |
| WO | WO 2008/058695 | 5/2008 |
| WO | WO 2008/071399 | 6/2008 |
| WO | WO 2008/084260 | 7/2008 |

OTHER PUBLICATIONS

PCT International Preliminary Report on Patentability, Application No. PCT/EP2009/007167, Issued Apr. 12, 2011.

Chinese Office Action for Application No. 200980139682.1 dated Oct. 21, 2013.

Chinese Office Action for Application No. 200980139682.1 dated Jan. 14, 2013.

Chinese Office Action for Application No. 200980139682.1 dated Jan. 29, 2015.

Chinese Office Action for Application No. 200980139682.1 dated Aug. 17, 2015.

* cited by examiner

-- PRIOR ART --

FORE FLAP DISPOSED ON THE WING OF AN AIRCRAFT

RELATED APPLICATIONS

The present application is a national stage entry according to 35 U.S.C. §371 of PCT application No.: PCT/EP2009/007167 filed on Oct. 6, 2009, which claims priority from German Application No.: 10 2008 050 544.7, filed on Oct. 6, 2008, and from U.S. Provisional Application No.: 61/102,977, filed on Oct. 06, 2008.

TECHINICAL FIELD

The invention concerns a leading edge slat arranged on the aerofoil of an aircraft.

BACKGROUND

For purposes of improving the lift on an aerodynamically effective wing, an aerofoil, a large number of high lift components are of known prior art, which serve to increase the curvature and/or the extent of the wing profile in the wing chordwise direction, and thus to increase the lift of the aerofoil. In high lift components, which with reference to the flow direction are provided on the front of the aerofoil profile, a differentiation is to be made between nose flaps, which essentially are joined to the front of the actual wing or main wing without any discontinuity, and leading edge slats, in which, at least in the extended state, a gap is present between the trailing edge of the leading edge slat and the leading edge of the main wing, through which high energy air, that is to say, air flowing at high velocity, is fed from the lower surface of the leading edge slat to the upper surface of the main wing, which results in a further increase in lift.

High lift components in the form of leading edge slats serve to provide extra lift for modern passenger and freight aircraft with a high takeoff weight. In one of the simplest, and therefore preferred, kinematic systems the leading edge slat as it extends moves on a circular track around an axis of rotation located underneath the forward region of the main wing, wherein the leading edge slat in a retracted cruise setting lies flat against the front of the main wing and supplements the profile of the latter to form a suitable shape for cruise flight. To increase the lift the leading edge slat is extended by pivoting around the said axis of rotation whilst increasing the curvature and the extent of the total wing profile in the wing chordwise direction, wherein with the circular arc kinematics cited a gap gradually forms between the trailing edge of the leading edge slat and the wing profile in the nose region of the main wing as the leading edge slat extends. While such a gap, leading high energy air from the lower surface of the leading edge slat to the upper surface of the main wing, is of advantage for the landing approach on account of its effect in increasing lift and delaying boundary layer separation and is thus desirable, it is disadvantageous for takeoff, on the other hand, on account of the increased drag that is associated with it. In general, therefore, an attempt is made to configure the actuation kinematics for the leading edge slat such that the leading edge slat in a first partially extended setting is suitable for takeoff, with its trailing edge lying flat against the main wing, and in a second, further extended setting is suitable for landing, with its trailing edge spaced apart from the surface skin of the main wing in the region of the profile nose of the latter, so as to open up a gap feeding high energy air from the lower surface of the leading edge slat to the upper surface of the main wing.

From U.S. Pat. No. 4,399,970, U.S. Pat. No. 5,839,699 and U.S. Pat. No. 6,682,023 high lift aids in the form of leading edge slats are of known art, in which the leading edge slat in the retracted position, in the takeoff position, and intermediate positions, does not open up any gap between leading edge slat and main wing. Such a gap is only continuously open during the further extension of the leading edge slat into the landing configuration. This is achieved by means of additional kinematic elements or (in the case of U.S. Pat. No. 5,839,699) by an adaptation of the nose profile of the main wing to the curved track of the leading edge slat trailing edge. Linked with such measures are, accordingly, either an increased weight as a result of the additional kinematic elements, or an aerodynamically disadvantageous gap geometry in the adaptation of the nose of the wing in the case last cited.

Furthermore from U.S. Pat. No. 4,753,402 a leading edge slat that can be extended relative to the main wing by means of arcuate rails is of known art, which is mounted such that it can rotate through a small angle relative to the rails and is pre-loaded by means of a leaf spring arrangement against the rails such that the gap between leading edge slat and main wing is increased if a certain aerodynamic force is exceeded, in that the trailing edge, directed rearwards, facing the main wing, is displaced against the spring force forwards and upwards. The leading edge slat itself has a rigid, unchanging profile.

SUMMARY

Various embodiments of the invention provide a leading edge slat of the kind presupposed above, such that it has a structurally simple design together with a low number of parts with, and at the same time, a high aerodynamic effectiveness.

By means of the invention is created a leading edge slat arranged on the aerofoil of an aircraft, wherein the aerofoil comprises a main wing with an upper surface skin, a lower surface skin, and a profile nose, and the leading edge slat is provided on the front of the main wing, and has a profile nose directed forwards, and a trailing edge directed rearwards, facing the main wing, and from a retracted cruise setting, in which the leading edge slat lies flat against the front of the main wing, and supplements the profile of the latter to form a shape suitable for cruise flight, can be extended to increase the lift with an increase in the curvature and extent of the wing profile in the wing chordwise direction, wherein the leading edge slat in a second (typically of a plurality) further extended setting with its trailing edge spaced apart from the profile nose of the main wing so as to open up a gap feeding high-energy air from the lower surface of the leading edge slat to the upper surface of the main wing. In accordance with the invention provision is made that the leading edge slat comprises a main body and a trailing edge part facing the main wing, which can be bent flexibly around the spanwise direction of the leading edge slat relative to the main wing, and on which the trailing edge of the leading edge slat is provided, and which by means of a device generating a contact force in the retracted and partially extended setting of the leading edge slat is loaded so as to ensure contact between the leading edge slat trailing edge and the profile nose of the main wing.

According to one form of embodiment of the leading edge slat according to the invention provision is made that the trailing edge part is connected with the main body of the leading edge slat via an articulation, in order that the trailing edge part can be bent flexibly around the spanwise direction of the leading edge slat relative to the main body.

According to one form of embodiment the articulation is formed by means of an elastic-in-bending element.

According to one form of embodiment the elastic-in-bending element is provided on an outer skin forming the upper surface of the leading edge slat.

According to one form of embodiment the device generating the contact force is provided connecting the lower surface of the trailing edge part with the main body of the leading edge slat.

According to one form of embodiment the device generating the contact force is formed by means of an elastic element.

Here provision can be made that the elastic element is an elastic-in-translation element.

According to another form of embodiment of the leading edge slat according to the invention the device generating the contact force is formed by means of an actuator.

According to another form of embodiment of the leading edge slat according to the invention, the elastic-in-bending element is formed by means of the trailing edge part itself, which, at least in a region adjacent to the main body of the leading edge slat, is formed by means of an elastic, flexible material.

According to one form of embodiment the elastic-in-bending element forming the articulation extends essentially over the total span of the leading edge slat.

According to one form of embodiment the elastic-in-translation element forming the device generating the contact force extends essentially over the total span of the leading edge slat.

According to one form of embodiment the actuator is formed by means of a shape memory actuator, or a piezo-actuator.

According to one further development of the invention the actuator is coupled with a control device for purposes of control, by means of which the actuator can be controlled such that in a partially extended setting of the leading edge slat the leading edge slat trailing edge for purposes of opening up the gap feeding air to the upper surface of the main wing in the interests of an increase of the maximum possible lift coefficient is optionally lifted from the main wing.

According to another further development of the leading edge slat according to the invention a stop element is provided for purposes of limiting the bending of the trailing edge part relative to the main body of the leading edge slat.

Here the stop element can be provided on the element generating the contact force.

In what follows examples of embodiment of the invention are elucidated with the aid of the drawing.

BRIEF DESCRITION OF THE DRAWINGS

Figure 3A:
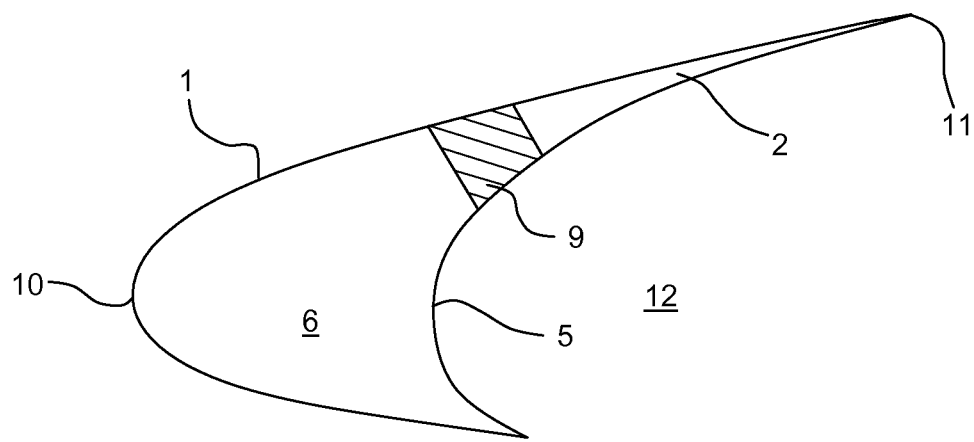
Figure 4:
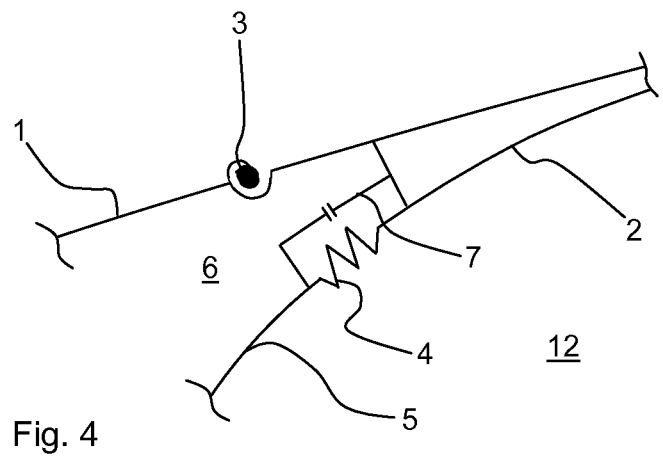
Figure 5:
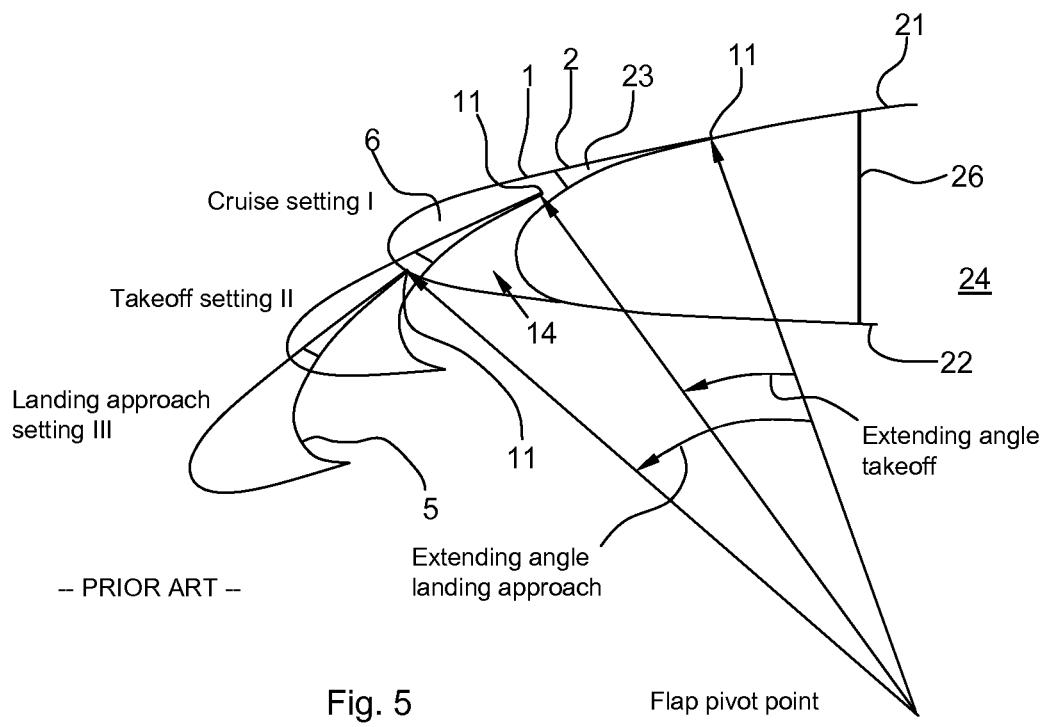

FIGS. 3a) and 3b) show in each case an enlarged cross-sectional view of a leading edge slat according to two further examples of embodiment of the invention;

FIG. 4 shows a further enlarged scrap section of a part of the leading edge slat according to the invention according to a yet further example of embodiment; and FIG. 5 shows a schematised cross-sectional representation of a leading edge slat according to the prior art, arranged on the aerofoil of an aircraft.

DESCRIPTION

Figure 1:
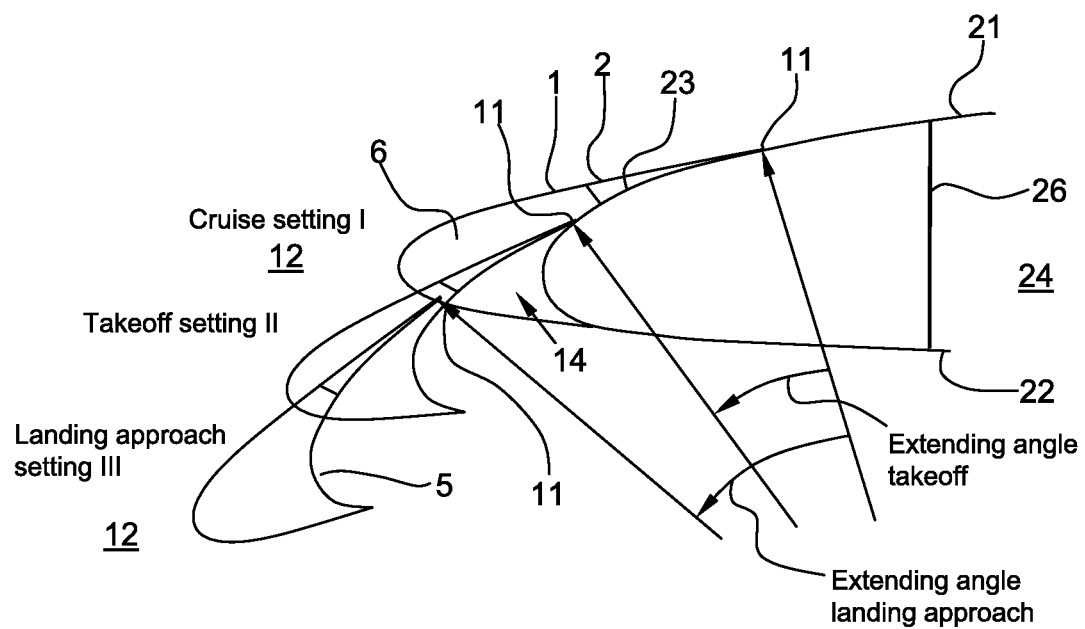
FIG. 1 shows a schematised cross-sectional representation of a leading edge slat according to one example of embodiment of the invention, arranged on the aerofoil of an aircraft.

FIG. 1 shows a leading edge slat 12 arranged on the aerofoil of an aircraft. The aerofoil comprises a main wing 24, which has an upper surface skin 21, a lower surface skin 22 and a profile nose 23. A spar 26 is provided as an inner structural load-bearing component of the main wing 24. The leading edge slat 12 is arranged on the front of the main wing 24 and has a profile nose 10 directed forwards, and a trailing edge 11 directed rearwards, facing the main wing 24.

The leading edge slat 12 can be extended from a retracted cruise setting I, in which the leading edge slat lies flat against the front of the main wing 24 and supplements the profile of the latter to form a shape suitable for cruise flight, to increase the lift with an increase in curvature and extent of the wing profile in the wing chordwise direction. In a first, partially extended setting II the leading edge slat 12 lies with its trailing edge 11 flat against the main wing 24; this setting can be designated as a takeoff setting, because it contributes to a wing profile suitable for the takeoff procedure. In a second, further extended setting III the trailing edge 11 of the leading edge slat 12 in contrast is spaced apart from the profile nose 23 of the main wing 24, so that a gap 14 is opened up, which feeds high energy air, that is to say, air having a high flow velocity, from the lower surface of the leading edge slat 12, to the upper surface 21 of the main wing 24. This setting can be designated as a landing approach setting, since it is suitable for providing a strong increase in lift on the landing approach. In the figure a single, partially extended setting II is represented as a "first" extended setting, and a single, further extended setting III is represented as a "second" extended setting; it is to be understood, however, that there are a number of settings between the cruise setting I, in which the leading edge slat 12, fully retracted, lies flat against the front of the main wing 24, and the first extended setting II represented, in which the trailing edge 11 of the leading edge slat 12 lies flat against the main wing 24, typically on the profile nose 23, and there are a number of extended settings between setting II and setting III, in which the said gap 14 is opened up. Typically the leading edge slat 12 can be extended continuously from the cruise setting I, to setting III, i.e. the fully extended setting.

Figure 2:
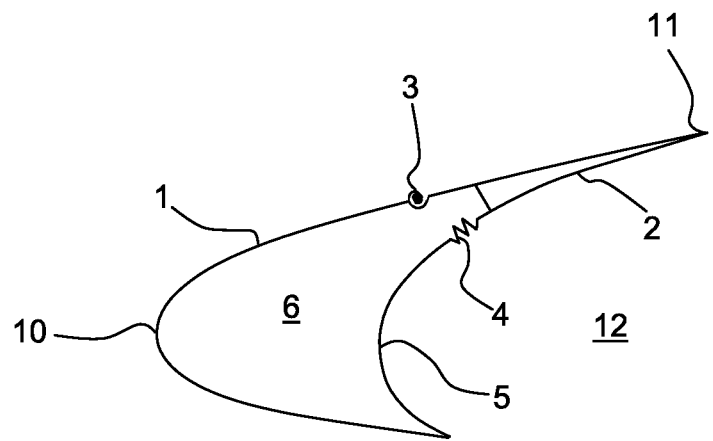
FIG. 2 shows an enlarged cross-sectional view through a leading edge slat according to one example of embodiment of the invention.

As FIG. 1, and in particular the enlarged FIGS. 2 and also 3a) and 3b) show, the leading edge slat 12 comprises a main body 6 and a trailing edge part 2, which faces the main wing 24. The trailing edge part 2 can be bent flexibly around the spanwise direction of the leading edge slat 12, that is to say, essentially around a direction or axis that runs more or less parallel to the wing leading edge, relative to the main body 6.

The trailing edge 11 of the leading edge slat 12, facing the main wing 24, is provided at the end of the trailing edge part, and thus by virtue of the circumstance that the trailing edge part can be bent flexibly around the spanwise direction, is able, during extension of the leading edge slat 12, to follow the contour of the main wing 24 in its forward region and to lie flat against the latter, as is shown in FIG. 1, between the cruise setting I and the partially extended setting II. In order that the trailing edge 11 can follow the contour of the main wing 24 in its forward region, i.e. on the profile nose 23, in the desired manner, a device generating a contact force is provided such that the leading edge slat trailing edge 11 lies flat against the main wing 24 in the retracted and partially extended settings of the leading edge slat 12; there is therefore no gap 14.

In the form of embodiment shown in FIG. 2 an elastic-in-bending element 3 is provided on the outer skin 1 forming the upper surface of the leading edge slat 12, which executes the function of an articulation. On the lower surface of the leading edge slat 12 in the example of embodiment shown in FIG. 2 is provided an elastic-in-translation element 4, that is to say an element that is alterable in its length in the direction parallel to the lower or rear surface skin of the leading edge slat 12 with the generation of an elastic force or spring force, and whose elastic stiffness is so dimensioned that in the desired region between the settings I and II the trailing edge 11 reliably lies flat against the profile nose 23 of the main wing 24; the gap 14 is therefore closed, even under the aerodynamic load acting on the trailing edge part 4, that is to say, under the pressure difference between the upper and lower surfaces of the wing. The elastic stiffness of the elastic-in-bending element 3 is to be taken into account appropriately in the design of the elastic-in-translation element 4.

With the further extension of the leading edge slat 12 beyond setting II in the direction towards setting III, cf. FIG. 1, the gap 14 is now required to be open continuously, i.e. the trailing edge 11 is no longer required to lie flat against the profile nose 23 of the main wing 24. A stop element 7 can, for example, be provided, which is schematically represented in the enlarged scrap sectional representation of FIG. 4, and/or the stiffness of the elastic elements 3 and 4 is to be designed appropriately. In the cruise setting the elastic-in-translation element 4 is so highly loaded that the trailing edge 11 reliably lies flat against the main wing 24, that is to say, anywhere in the range of transition from the profile nose 23 to the upper surface skin 21 of the main wing 24, as is represented in FIG. 1. During extension of the leading edge slat 12 from the cruise setting I to the takeoff setting II the elastic-in-translation element 4 shortens in length, since the trailing edge part 2 is increasingly bent in the direction towards the profile nose 23 as the leading edge slat 12 is extended.

For purposes of comparison FIG. 5 shows a schematic representation similar to FIG. 1 for the case of a leading edge slat 12 with a rigid trailing edge component. It can be seen that during extension of the leading edge slat 12 a gap 14 continuously arises between the trailing edge 12 and the profile nose 23. The reason for this is that the radius of the track, typically a circular track, over which the leading edge slat 12 is extended, is greater than the radius of curvature of the profile nose in the corresponding region.

The elastic-in-bending element forming the device generating the contact force can also be formed by means of the trailing edge part 2 itself, which then, at least in a transition region 9, that is to say, in a region adjacent to the main body 6 of the leading edge slat 12, is formed in terms of an elastic, flexible material with appropriate restorative properties, in other words, an appropriate elastic stiffness. Such an elastic material is shown (schematically by a hatched region) in FIG. 3*a*).

Figure 3B:
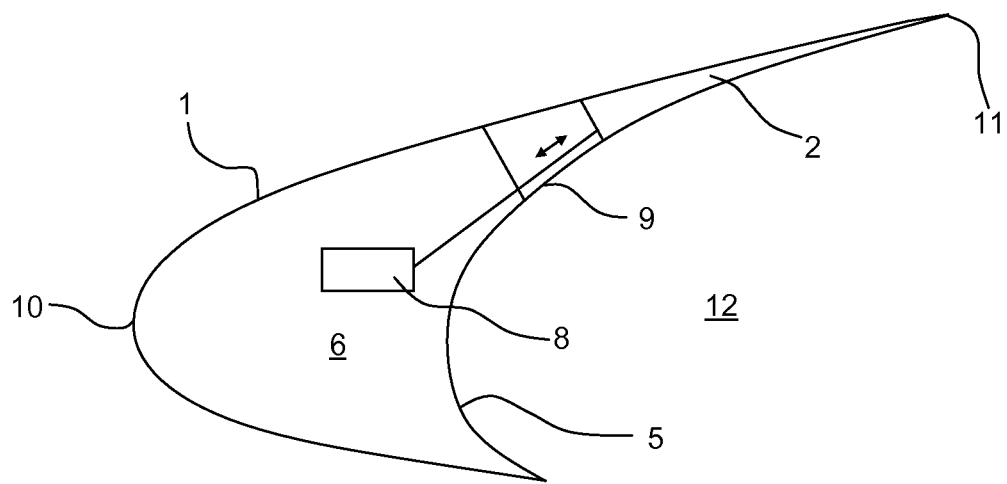

Alternatively the device generating the contact force can be formed in terms of a (controllable) actuator 8, as is represented schematically in FIG. 3*b*). Such an actuator can be implemented in a number of suitable ways, for example by the deployment of shape memory alloys or piezo-actuators. In this manner an active control of the size of the gap 14 would also be possible.

This could be utilised to the effect that the gap 14 in the takeoff configuration, setting II, is closed for conventional angles of attack of the aircraft, but opens in the event of unusually high angles of attack, as a result of which the maximum available lift coefficient of the aircraft is significantly improved. By this means flight safety and aircraft design can be advantageously influenced.

The elastic-in-bending element 3, which fulfils the articulation function, will typically extend over essentially the total length of the leading edge slat 12 in the spanwise direction. This element 3 can, for example, be manufactured as a continuous spring element made of spring steel, or a fibre-reinforced plastic, which has an appropriate elasticity in bending, i.e. flexibility. The elastic-in-bending element 3 can be integrally provided in the outer skin 1, that is to say, as a region flexible in sections at the transition between the main body 6 and the trailing edge part 2 of the leading edge slat 12 in the outer skin 1, or it can be manufactured as a separate part, and then introduced at this location into the outer skin 1 of the leading edge slat 12. The fixing to the outer skin 1 can be undertaken using adhesive or a rivet joint in a conventional manner. By means of an appropriate design of the shape and thickness of the element 3 it can be adapted to the stiffness and strength requirements that apply here.

The elastic-in-translation element 4 can likewise be manufactured as a continuous spring element, which then in turn extends essentially over the total span of the leading edge slat 12. This can also be manufactured from spring steel or a fibre-reinforced plastic. In particular it is appropriate to manufacture this element 4 in a leaf spring form of construction. It can then consist of a plurality of leaves lying one above another and able to move relative to one another. By a suitable choice of the number and thickness of leaves the necessary strength and desired elastic stiffness can be achieved at the same time.

Instead of the representation in FIGS. 2 and 4, the elastic-in-bending element 3 and the elastic-in-translation element 4 can also be changed over, in other words the former can be arranged underneath and the latter on top. Also the articulation, or more generally expressed, the axis of rotation around which the trailing edge part 2 can be bent flexibly relative to the main body 6, could be located in the interior of the leading edge slat 12 at the half height position, or any other position between the upper and lower surface skins of the leading edge slat 12, both the upper and lower surface skins of the leading edge slat 12 are then subject to a corresponding alteration in length. In particular, this would be the case in the example of embodiment of FIG. 3*a*) with the elastic material in the transition region 9 between main body 6 and end part 2.

The stop shown in FIG. 4 can be provided independently, or together with the element 4; 8 generating the contact force, be this an elastic element or an actuator.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

REFERENCE SYMBOL LIST

1 Outer edge
2 Trailing edge component
3 Elastic-in-bending element
4 Elastic-in-translation element
5 Rear surface skin
6 Main body
7 Stop element
8 Actuator
9 Elastic region
10 Profile nose
11 Trailing edge
12 Leading edge slat
14 Gap
21 Upper surface skin
22 Lower surface skin
23 Profile nose
24 Main wing
26 Spar

The invention claimed is:

1. A leading edge slat arranged on an aerofoil of an aircraft, wherein the aerofoil comprises a main wing with an upper surface skin, a lower surface skin, and a profile nose, and the leading edge slat is provided on the front of the main wing and has a profile nose directed forwards and a trailing edge directed rearwards, facing the main wing, and from a retracted cruise setting, in which the leading edge slat lies flat against the front of the main wing and supplements the profile of the latter to form a shape suitable for cruise flight, can be extended for purposes of increasing the lift with an increase in curvature and extension of a wing profile in the wing chordwise direction, wherein the leading edge slat in a first, partially extended, setting with the trailing edge lying flat against the main wing and in a second, further extended, setting with the trailing edge spaced apart from the profile nose of the main wing so as to open up a gap feeding high-energy air from the lower surface of the leading edge slat to the upper surface of the main wing, wherein the leading edge slat comprises a main body and the trailing edge part facing the main wing, which can be bent flexibly around the spanwise direction of the leading edge slat relative to the main body, and on which the trailing edge of the leading edge slat is provided, and which, by means of a device generating a contact force, is loaded for purposes of making contact between the leading edge slat trailing edge and the profile nose of the main wing, wherein the trailing edge part is connected with the main body of the leading edge slat via an articulation, in order that the edge that trailing edge part can be bent flexibly around the spanwise direction of the leading slat relative to the main body, wherein the articulation is formed by an elastic-in-bending element, wherein the elastic-in-bending element is formed by the trailing edge part itself, which, at least in a region adjacent to the main body of the leading edge slat, is formed by an elastic, flexible material, and wherein all of the articulation of the trailing edge with respect to a leading edge of the leading edge slat occurs within the elastic-in-bending element.

2. The leading edge is slat in accordance with claim 1, wherein the elastic-in-bending element is provided on an outer skin forming the upper surface of the leading edge slat.

3. The leading edge slat in accordance with claim 2, wherein the device generating the contact force is provided connecting the lower surface of the trailing edge part with the main body of the leading edge slat.

4. The leading edge slat in accordance with claim 1, wherein the elastic-in-bending element extends essentially over the total span of the leading edge slat.

\* \* \* \* \*